United States Patent Office 3,092,127
Patented June 4, 1963
:::

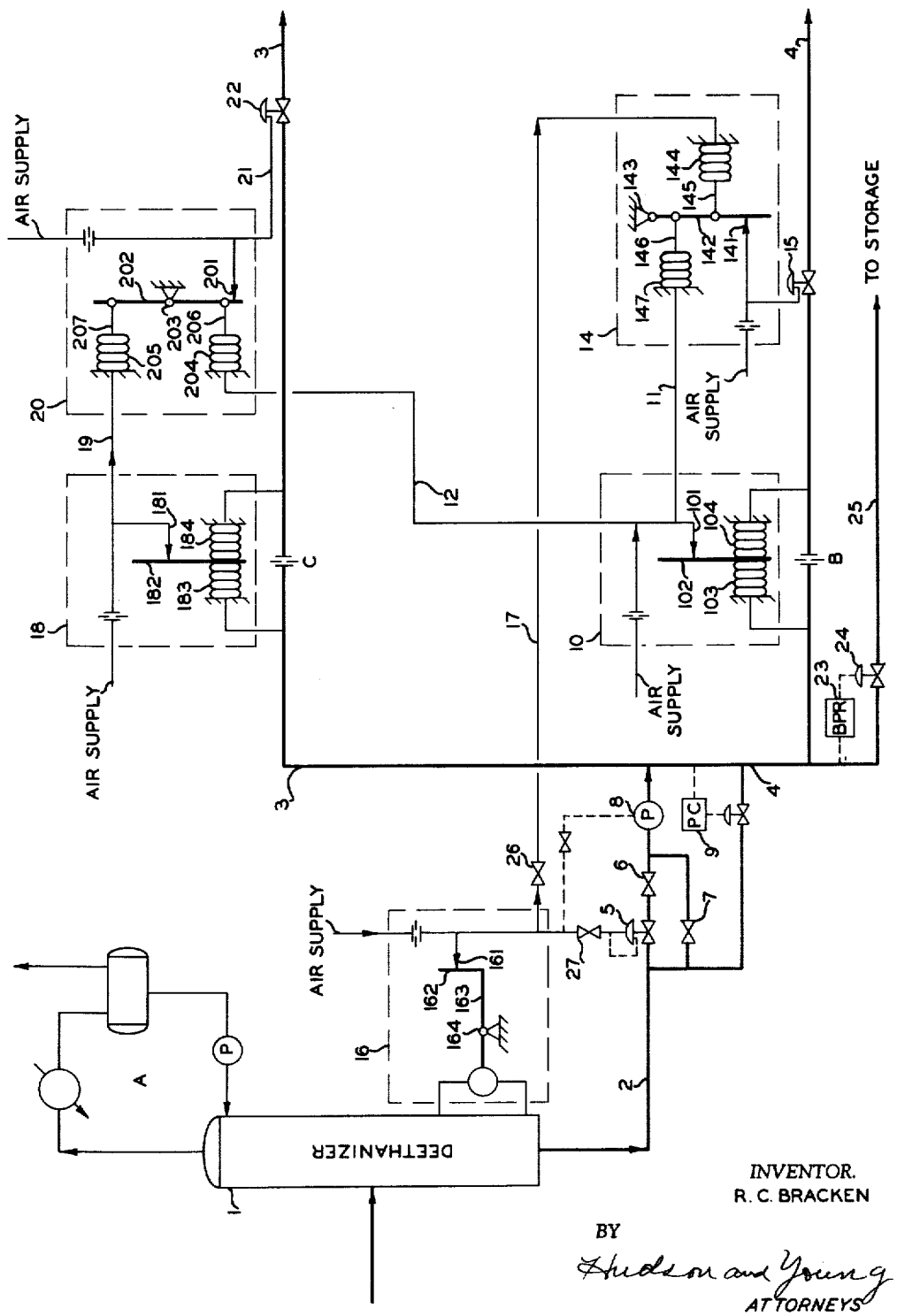

3,092,127
PROPORTIONING STREAM FLOWS
Robert C. Bracken, Bartlesville, Okla., assignor to Phillips Petroleum Company, a corporation of Delaware
Filed Dec. 1, 1958, Ser. No. 777,248
7 Claims. (Cl. 137—9)

This invention relates to proportioning stream flows. In one of its aspects, the invention relates to the division of a single stream into a plurality of streams, for example, two streams, by maintaining, by use of a recording-flow-controller, a predetermined flow of a first-divided stream and by maintaining with a ratio-controller flow-recorder-controller a second stream proportionate in a ratio to said first stream. In another of its aspects, the invention relates to the maintaining of a constant level of a source of supply independent from flow to said source of supply by causing said recorder-flow-controller to be responsive to said liquid level and to be reset thereby. In a further aspect, the invention relates to the division of a stream or flow into several streams or flows by supplying a stream under constant pressure from a source of supply which can vary and dividing said stream as already described. In a still further aspect, the invention relates to an apparatus combination suitable for effecting the herein-described operations. In a specific embodiment, the various aspects of the invention are applied to the division of a gasoline deethanizer bottoms into several flows which can be and are delivered in a given ratio but not necessarily at the same pressure.

The invention will be described with respect to the said specific embodiment. It will be apparent to one skilled in the art in possession of this disclosure that the invention can be applied to other materials or streams. Thus, the following description is for disclosure purposes to meet the requirements of the statutes, rules and practice thereunder, and is not limiting of the scope of the invention described in the claims appended hereto.

It is customary practice when distributing a product from a fractionation operation, for example, the gasoline deethanization operation herein described as illustrative of the invention, to two different sources of utilization, to pass the product from the fractionation system into a tank and to divide the product from the tank by the use of a meter so that each source receives its proportionate part. Following this practice, it is necessary to employ at least one storage tank and outlet; it is preferable to employ at least two storage tanks. Thus, the product is passed into a first tank and gaged therein. Then the product is passed into a second tank during the period that the first tank is being pumped out after having been gaged. When volatile materials are being produced and transported, it is necesary to use expensive, strong tanks to hold the products. I have now conceived of a method and apparatus which permits passing product from a fractionation system or other source, the supply of which can vary, directly into a plurality of pipes while the ratio of the flow through each pipe is maintained constant, as appears below.

It is an object of this invention to provide a method and a means for proportioning stream flows. It is another object of this invention to divide a stream or flow into a plurality of proportioned stream flows, even when the source of the flow to be divided varies in rate. It is another object of this invention to provide apparatus permitting the supply of proportioned streams, each at a desired pressure. It is a further object of this invention to divide a hydrocarbon fraction which can be supplied at varying rates into two or more proportioned streams which can be at different pressures.

Other aspects, objects and the several advantages of this invention will be apparent from a study of this disclosure, the drawing and the appended claims.

According to this invention, there is provided a method which comprises removing from a source of supply which can vary a fluid, preferably maintaining said fluid at a predetermined pressure, dividing and moving said fluid into a plurality of conduits, moving the fluid through one of said conduits at a predetermined recorded and controlled rate of flow, redetermining said rate of flow responsive to variations in rate of said supply, moving fluid through another of said conduits, recording and controlling flow of fluid through said another of said conduits in a predetermined ratio with respect to flow of fluid in said first conduit, adjusting the control of flow of fluid in said another of said conduits responsive to changes of flow of fluid in said first conduit and thus maintaining the flow of fluid in said conduits in said predetermined ratio.

Also according to the invention, there is provided an apparatus for dividing and proportioning a flow of a fluid which comprises in combination means for maintaining said fluid at a constant predetermined pressure independently from the rate and pressure of its supply, means for dividing said fluid into a plurality of flows, means for separately conducting each of said plurality of flows, means upon a first means for separately conducting each of said plurality of flows for recording the rate of flow of said fluid therein, means controlled by said last-mentioned means for controlling flow of fluid in said first means to a predetermined rate, means upon the source of supply for redetermining said predetermined rate responsive to variation in supply, means upon another of said means for separately conducting each of said plurality of flows to record the flow of fluid therein, means upon said another means for separately conducting each of said plurality of flows for controlling the rate of flow therein at a predetermined rate and in a given proportion to the flow in said first-mentioned means for separately conducting each of said plurality of flows and means responsive to the rate of flow in said first-mentioned means for separately conducting each of said plurality of flows for redetermining the rate to which the means for controlling flow in said second means for separately conducting each of said plurality of flows controls the flow in said second means for conducting each of said plurality of flows to maintain each of the rates of said separate flows in a predetermined ratio.

The method and apparatus of this invention will now be more fully set forth and more fully described by reference to the drawing.

Referring now to the drawing, in which there is shown diagrammatically an operation according to the invention in which a natural gasoline fraction is deethanized in deethanizer 1 and passed by way of pipe 2 to each of two delivery lines 3 and 4, in a controlled ratio as now described, conditions are chosen to accomplish suitable deethanization on the gasoline. In this specific embodiment, the tower is maintained under a pressure of 500 p.s.i.g., the tower top temperature is 120° F. and the bottoms are maintained at a temperature of 285° F. by reboiler means not shown for sake of simplicity. Overhead from tower 1 is passed by way of a vapor pipe to a cooler-condenser from which it passes by way of a pipe into a gas separator, gas being removed by way of a gas takeoff pipe. Reflux is returned to a place near the top of the tower by way of a pipe. The equipment just described is indicated generally as A and forms no part of the claimed invention.

Deethanized gasoline is passed from tower 1 by way of pipe 2 into pipes 3 and 4. The level in the base of the tower 1 is controlled in this embodiment to a constant level and, therefore, depending upon variation in feed to the tower or bottoms, makes the flow in pipe 2, as well as the flows in pipes 3 and 4, vary, as further described below. Pump 8 is operated responsive to the level control 16 and feeds product to pipes 3 and 4 and pressure in pipes 3 and 4 is controlled by pressure controller 9 to maintain the pressure in pipes 3 and 4 constant regardless of rate of flow of fluid therein. In the operation of the embodiment presently described, valve 5 in pipe 2 is closed while valve 7 is open.

In the description which follows, reference is made to units 10, 14, 16, 18 and 20 which are provided in the drawing for sake of illustration, it being understood that these units are shown in abbreviated schematic form. Thus, one skilled in the art in possession of this disclosure will realize that there are available commercially highly effective units for each of the duties performed in the drawing by units 10, 14, 16, 18 and 20. Thus, transmitters 10 and 18 can be those made by the Foxboro Company, Foxboro, Massachusetts, Foxboro type 13–A pneumatic flow transmitter listed in bulletin 13–11A. The rate of flow controller 14 can be Foxboro model M5412–58P4 receiver-recorder controller with pneumatic set listed in bulletin 463, Foxboro Company, Foxboro, Massachusetts. Ratio-flow controller 20 may be pneumatic flow transmitter Foxboro type 13A listed in bulletin 13–11A, Foxboro Company, Foxboro, Massachusetts. Liquid level controller 16 can be that made by Fisher Governor Company, Marshalltown, Iowa, listed in bulletin F4A, #2500–259.

Flow transmitter 10, which operates responsive to the pressure drop across orifice B in pipe 4, sends a pneumatic signal through lines 11 and 12 responsive to the rate of flow of liquid flowing through pipe 4. Rate of flow controller 14 receives a pneumatic signal through line 11 which is representative of the rate of flow of liquid through line 4 and actuates motor valve 15 to control the rate of flow of liquid through line 4. Liquid level controller 16 sends a pneumatic signal through line 17 which is responsive to changes in the depth of liquid at the base of deethanizer 1. Controller 14 receives the signal in line 17 and is reset to maintain a constant level of liquid in the base of deethanizer 1. Thus, pneumatic transmitter 10 and controller 14 coact together with controller 16 to establish at all times desired flow through pipe 4 and to thus maintain the level in deethanizer 1 substantially constant.

Pneumatic transmitter 18 is similar to transmitter 10, sending a signal through line 19 responsive to the rate of flow through pipe 3 detected at orifice C. Ratio controller 20 receives the pneumatic signals from pipes 12 and 19 respectively and transmits a resulting signal through pipe 21 to valve 22 in pipe 3 which is controlled by said signal.

A back pressure regulator 23 actuating valve 24 in pipe 25 will relieve any undesired excess pressure which may blow up between the discharge of pump 8 and valves 15 and 22 in pipes 4 and 3, respectively.

By way of further illustration, but not by way of limitation, the operation of the various units described will now be further described in some detail, it being understood that these units are as stated shown in brief schematic form, as will be understood by one skilled in the art in possession of this disclosure. Air is supplied to each of the units as indicated on the drawing. In unit 16, air is bled through nozzle 161 depending upon the position of flapper 162 which is attached to lever 163 pivoted at 164. As the level in deethanizer 1 is lowered, flapper 162 moves away from nozzle 161, permitting more air to bleed through said nozzle, correspondingly lowering the pressure of the air in pipe 17. This lower pressure is sensed in controller 14, as later described. Air is supplied as shown to pneumatic transmitter 10 and bled by way of nozzle 101 which is positioned in proximity to flapper 102. The pressure in bellows 103 and 104 is responsive to the flow of liquid through orifice B in pipe 4. Flapper 102, positioned between the bellows, accordingly moves toward or away from nozzle 101, depending upon the flow of fluid in pipe 4, and as the velocity of liquid across orifice B decreases, flapper 102 moves away from nozzle 101 by movement of the bellows and vice versa. The pressure in pipes 11 and 12 is dependent upon the rate at which air from the air supply is bled at nozzle 101.

Air is supplied to controller 14 as shown and is passed therefrom actuating motor valve 15. Acting on this air supply is the combination of nozzle 141 and flapper 142, pivoted at 143. The signal passing by way of pipe 17 to controller 14 actuates by way of bellows 144 and lever 145 upon flapper 142. Also, the signal passing by way of pipe 11 to controller 14 actuates by way of bellows 147 and lever 146, also upon flapper 142. Thus, the air bled at nozzle 141 is bled responsive to the combined actions of signals 11 and 17 and, therefore, valve 15 is operated to maintain a desired level in deethanizer 1.

As described in connection with pneumatic transmitter 10, air supplied to pneumatic transmitter 18 is bled therein by way of nozzle 181, the rate of air flow through said nozzle being controlled by flapper 182, the flapper in turn being actuated by bellows 183 and 184 responsive to the pressure differential across orifice C in pipe 3. A resulting air pressure signal is passed by way of pipe 19 to controller 20. Also, the signal in pipe 12 is passed to controller 20. Controller 20 is supplied with air, as shown. This air is bled at nozzle 201 against flapper 202, pivoted at 203. The signals in pipes 12 and 19 actuate bellows 204 and 205 respectively, which in turn actuate levers 206 and 207 which act respectively upon flapper 202. This results in a signal in pipe 21 which operates valve 22 in pipe 3. By choosing sizes of bellows and respective lengths of the portions of flapper 202 to either side of pivot 203, as one skilled in the art will understand, there can be and is set up according to the invention a flow through valve 22 which at all times will be in a certain desired ratio with respect to the flow through valve 15 in pipe 4 although, as it will be understood, the rate of flow in each of these pipes can vary.

It will be understood by one skilled in the art that the foregoing description of details of the schematically illustrated controllers and associated equipment are given for disclosure purposes only. The operation within the respective transmitters and controllers does not form a part of the invention which is claimed, the claimed invention being in the combination of the apparatus and the combination of operations which result in the proportioning of the respective flows regardless of total flow.

According to this invention, it is possible by suitable choice of size of equipment such as pipes, valves, etc. and control settings to deliver predetermined proportions of gasoline by way of pipes 3 and 4 and to deliver these proportions at different pressures. In the embodiment which has been described, the kettle product is arranged so that pipe 3 discharges at a pressure in the range 300–800 p.s.i.g. and pipe 4 discharges at a pressure in the range 250–750 p.s.i. The flows in these pipes are 85,000 gallons/day and 85,000 gallons/day, respectively.

One skilled in the art in possession of this disclosure having studied the same can readily select equipment currently available to act as the units represented in the drawing.

It will be appreciated by one skilled in the art in possession of this disclosure that a number of refinements or details have been omitted for sake of simpliicty and that eqivalent but different structures can be provided to generally accomplish the modus operandi set forth.

Reasonable variation and modification are possible within the scope of the foregoing disclosure, drawing and appended claims to the invention, the essence of which is that there have been provided a method and apparatus for dividing a stream of fluid or liquid into at least two flows, the rates of which are maintained in a predetermined proportion irrespective of variations of total flow or supply of said fluid or liquid by controlling a first-divided stream to a predetermined rate of flow, redetermining said predetermined rate of flow responsive to variation and supply of the fluid, controlling a second stream at a rate of flow in a predetermined ratio to the rate of flow of said first-divided stream, the apparatus comprising in one embodiment the respective components in combination as described in combination with said drawing.

I claim:

1. A method for supplying a fluid to a plurality of conduits from a common source and maintaining a predetermining ratio of fluid flow in said conduits which comprises removing from a source of supply, which can vary, a fluid, maintaining said fluid at a predetermined pressure, dividing and moving said fluid into a plurality of conduits, moving the fluid through one of said conduits at a predetermined recorded and controlled rate of flow, readjusting and controlling said rate of flow responsive to variations in rate of said supply, moving fluid through another of said conduits, automatically recording and controlling flow of fluid through another of said conduits in a predetermined ratio with respect to flow of fluid in said first conduit, automatically effecting said controlling of flow of fluid in said another of said conduits responsive to changes of flow of fluid in said first conduit and thus maintaining the flow of fluid in said conduits in said predetermined ratio.

2. A method for supplying a fluid to a plurality of conduits from a common source and maintaining a predetermined ratio of fluid flow in said conduits which comprises removing from a source of supply, which can vary, a fluid, dividing and moving said fluid into a plurality of conduits, moving the fluid through one of said conduits at a predetermined recorded and controlled rate of flow, readjusting and controlling said rate of flow responsive to variations in rate of said supply, moving fluid through another of said conduits, automatically recording and controlling flow of fluid through said another of said conduits in a predetermined ratio with respect to flow of fluid in said first conduit, automatically effecting said control of flow of fluid in said another of said conduits responsive to changes of flow of fluid in said first conduit and thus maintaining the flow of fluid in said conduits in said predetermined ratio.

3. A method for supplying a fluid to a plurality of conduits from a common source and maintaining a predetermined ratio of fluid flow in said conduits for supply to each of a plurality of places of utilization a separate flow of deethanized gasoline which comprises removing from a gasoline deethanizer a deethanized gasoline fraction, pumping said gasoline into a conduit responsive to a predetermined pressure in said conduit thus to maintain the gasoline flowing through said conduit at a predetermined pressure, dividing gasoline flow in said conduit into two flows and moving each of said flows, respectively, into each of two conduits, automatically measuring and controlling to a predetermined rate of flow of gasoline moving in the first of said two conduits, readjusting and controlling the predetermined rate of flow in said last-mentioned conduit responsive to the liquid level in said deethanizer, measuring and controlling the rate of flow in the second of said two conduits at a predetermined rate which is in a predetermined ratio to the rate of flow in the first of said two conduits and automatically readjusting the rate of flow to which the flow in said second conduit is controlled responsive to changes of rate of flow in the first of said two conduits thus delivering deethanized gasoline to said places of utilization in a predetermined ratio.

4. An apparatus for dividing and proportioning a flow of a fluid which comprises, in combination, means for maintaining said fluid at a constant predetermined pressure independently from the rate and pressure of its supply, means for dividing said fluid into a plurality of flows, individual means for separately conducting each of said plurality of flows, means upon a first individual means for separately conducting one of said plurality of flows for recording the rate of flow of said fluid therein, means controlled by said last-mentioned means for controlling flow of fluid in said first individual means to a predetermined rate, means upon the source of supply for redetermining said predetermined rate responsive to variation in supply, means upon another of said individual means for separately conducting each of said plurality of flows to record the flow of fluid therein, means upon said another of said individual means for separately conducting each of said plurality of flows for controlling the rate of flow therein at a predetermined rate and in a given proportion to the flow in said first-mentioned individual means for separately conducting each of said plurality of flows and means responsive to the rate of flow in said first-mentioned individual means for separately conducting each of said plurality of flows for redetermining the rate to which the means for controlling flow in said second individual means for separately conducting each of said plurality of flows controls the flow in said second individual means for conducting of each of said plurality of flows to maintain each of the rates of said separate flows in a predetermined ratio.

5. An apparatus for dividing and proportioning a flow of fluid which comprises, in combination, means for dividing said fluid into a plurality of flows, means for separately conducting each of said plurality of flows, means upon a first individual means for separately conducting each of said plurality of flows for recording the rate of flow of said fluid therein, means controlled by said last-mentioned means for controlling flow of fluid in said first individual means to a predetermined rate, means upon the source of supply for redetermining said predetermined rate responsive to variation in supply, means upon another of said individual means for separately conducting each of said plurality of flows to record the flow of fluid therein, means upon said another individual means for separately conducting each of said plurality of flows for controlling the rate of flow therein at a predetermined rate and in a given proportion to the flow in said first-mentioned individual means for separately conducting each of said plurality of flows and means responsive to the rate of flow in said first-mentioned individual means for separately conducting each of said plurality of flows for redetermining the rate to which the means for controlling flow in said second individual means for separately conducting each of said plurality of flows controls the flow in said second individual means for conducting each of said plurality of flows to maintaining each of the rates of said separate flows in a predetermined ratio.

6. An apparatus for supplying gasoline to at least two separate places of utilization at rates of flow in a predetermined proportion which comprises a gasoline deethanizer, a pipe connected to the bottom of said deethanizer for removing gasoline therefrom, a pump in said pipe, a pipe connected to the discharge end of said pump, a level responsive pump control operatively connected to the intake of said pump, two separate pipes teed to said pipe at the discharge of said pump, a flow orifice in each of said pipes teed as described, transmitters respectively and operatively connected to said orifices, a valve in each of said teed pipes, a liquid-level-controller on said deethanizer, a recorder-flow-controller operatively connected to the transmitter and valve in a first of said teed pipes and to said liquid-level-controller on said deethanizer, and a ratio-controller recorder-flow-controller operatively connected to the transmitter and valve in the second teed pipe and to the orifice in said first of said teed pipes.

7. An apparatus for supplying gasoline to at least two separate places of utilization at rates of flow in a predetermined proportion which comprises a gasoline deethanizer, a pipe connected to the bottom of said deethanizer for removing gasoline therefrom, a pump in said pipe, a pipe connected to the discharge end of said pump, two separate pipes teed to said pipe at the discharge of said pump, a flow orifice in each of said pipes teed as described, transmitters respectively and operatively connected to said orifices, a valve in each of said teed pipes, a liquid-level-controller on said deethanizer, a recorder-flow-controller operatively connected to the transmitter and valve in a first of said teed pipes and to said liquid-level-controller on said deethanizer, and a ratio-controller recorder-flow-controller operatively connected to the transmitter and valve in the second teed pipe and to the orifice in said first of said teed pipes.

References Cited in the file of this patent

UNITED STATES PATENTS

| | | |
|---|---|---|
| 2,169,175 | Ziebolz | Aug. 8, 1939 |
| 2,290,125 | Donaldson | July 14, 1942 |
| 2,622,610 | Rowe | Dec. 23, 1952 |
| 2,661,756 | Noon | Dec. 8, 1953 |
| 2,774,368 | Jones | Dec. 18, 1956 |
| 2,786,482 | Bayer | Mar. 26, 1957 |
| 2,845,939 | Bayer | Aug. 5, 1958 |

UNITED STATES PATENT OFFICE
CERTIFICATE OF CORRECTION

June 4, 1963

Patent No. 3,092,127

Robert C. Bracken

It is hereby certified that error appears in the above numbered patent requiring correction and that the said Letters Patent should read as corrected below.

Column 5, line 21, after "through" insert -- said --; line 57, for "of", second occurrence, read -- the --; column 6, line 22, strike out "of", first occurrence.

Signed and sealed this 21st day of April 1964.

(SEAL)
Attest:
ERNEST W. SWIDER

Attesting Officer

EDWARD J. BRENNER

Commissioner of Patents